(12) United States Patent
Heil

(10) Patent No.: US 8,092,674 B2
(45) Date of Patent: Jan. 10, 2012

(54) TRAVELING BAND SCREEN MACHINE

(75) Inventor: Klaus Heil, Schweigen-Rechtenbach (DE)

(73) Assignee: Passavant-Geiger GmbH, Aarbergen (DE)

( * ) Notice: Subject to any disclaimer, the term of this patent is extended or adjusted under 35 U.S.C. 154(b) by 0 days.

(21) Appl. No.: 13/057,385

(22) PCT Filed: Jul. 16, 2009

(86) PCT No.: PCT/EP2009/005156
§ 371 (c)(1),
(2), (4) Date: Feb. 8, 2011

(87) PCT Pub. No.: WO2010/015317
PCT Pub. Date: Feb. 11, 2010

(65) Prior Publication Data
US 2011/0139692 A1 Jun. 16, 2011

(30) Foreign Application Priority Data
Aug. 8, 2008 (DE) .......................... 10 2008 037 059

(51) Int. Cl.
*B01D 33/333* (2006.01)
*B01D 33/50* (2006.01)
*B01D 33/70* (2006.01)
(52) U.S. Cl. ...................... 210/158; 210/160; 210/170.1
(58) Field of Classification Search .......................... None
See application file for complete search history.

(56) References Cited

U.S. PATENT DOCUMENTS

| 1,573,785 | A | * | 2/1926 | Albright | 405/82 |
|---|---|---|---|---|---|
| 1,579,105 | A | * | 3/1926 | Green | 405/82 |
| 1,903,627 | A | * | 4/1933 | Koch | 405/82 |
| 2,071,670 | A | * | 2/1937 | Warner | 405/82 |
| 2,804,209 | A | * | 8/1957 | Eastling et al. | 210/158 |
| 3,802,565 | A | * | 4/1974 | Hughes et al. | 210/160 |
| 4,169,792 | A | * | 10/1979 | Dovel | 210/793 |
| 4,199,453 | A | * | 4/1980 | McCawley et al. | 210/160 |
| 4,541,930 | A | * | 9/1985 | Heidler et al. | 210/344 |
| 4,582,601 | A | * | 4/1986 | Strow et al. | 210/161 |
| 4,812,231 | A | | 3/1989 | Wiesemann | |
| 4,935,131 | A | * | 6/1990 | Pindar | 210/160 |
| 5,242,583 | A | * | 9/1993 | Thomas | 210/161 |
| 5,326,460 | A | * | 7/1994 | Cheesman et al. | 210/160 |
| 5,501,793 | A | * | 3/1996 | Cheesman et al. | 210/160 |
| 6,187,184 | B1 | * | 2/2001 | Reetz et al. | 210/155 |
| 7,048,850 | B2 | * | 5/2006 | DePaso et al. | 210/155 |
| 7,575,674 | B2 | * | 8/2009 | Chang | 210/158 |

(Continued)

FOREIGN PATENT DOCUMENTS
AT 199573 B 9/1958
(Continued)

*Primary Examiner* — Robert James Popovics
(74) *Attorney, Agent, or Firm* — Walter A. Hackler

(57) ABSTRACT

A traveling band screen machine (1) is proposed with a careful fish return. To this end, the screen panels (4) each have a fish lifting channel (26) in which fishes (28) in a liquid-filled collecting recess (27) are lifted out of the stream of liquid and then emptied in the upper guidance zone (21) of the endless screen band (6) in an emptying zone (29) of the screen band machine (1) into a catch collecting drain (30) by tilting the screen panel (4) and the collecting recess (27) before the screen panel (4) reaches the cleaning zone (14) with the spray nozzles (23), in which debris deposited from the sluice channel on the screen panel (4) is cleaned off into the debris collecting drain (24).

21 Claims, 6 Drawing Sheets

U.S. PATENT DOCUMENTS

| | | | | |
|---|---|---|---|---|
| 7,722,762 | B2 * | 5/2010 | Zubair | 210/160 |
| 7,776,212 | B2 * | 8/2010 | Wunsch et al. | 210/158 |

FOREIGN PATENT DOCUMENTS

| | | | |
|---|---|---|---|
| DE | 533243 | A | 8/1931 |
| DE | 1051810 | A | 3/1959 |
| DE | 1083231 | A | 6/1960 |
| DE | 1942234 | A | 3/1971 |
| DE | 3932922 | C1 | 3/1991 |
| DE | 4238411 | A1 | 5/1993 |
| DE | 4443091 | C1 | 1/1996 |
| EP | 0913182 | A1 | 10/1998 |
| EP | 1897810 | A1 | 9/2006 |
| GB | 2236492 | A | 4/1991 |
| GB | 2261421 | A | 5/1993 |

\* cited by examiner

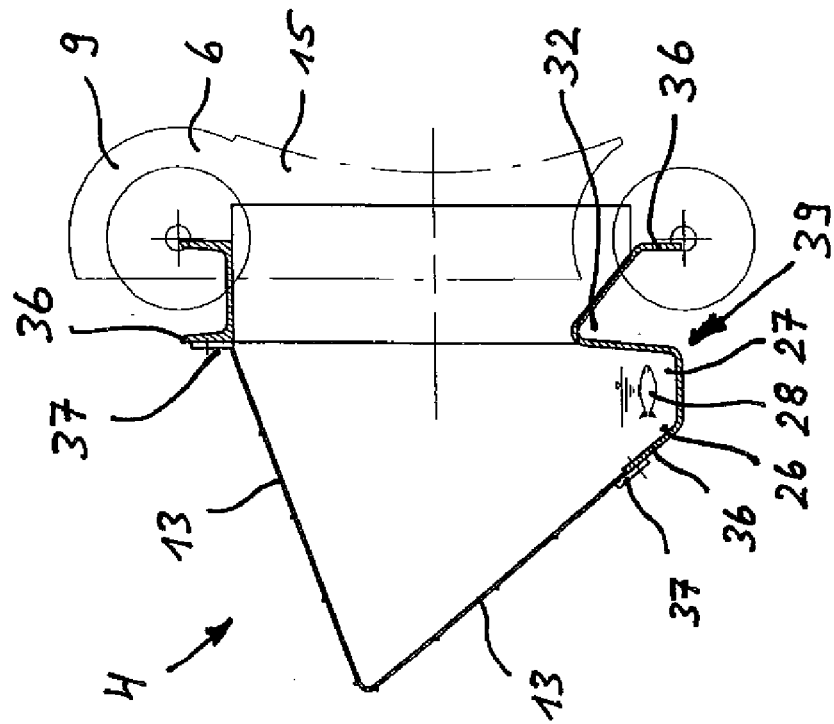
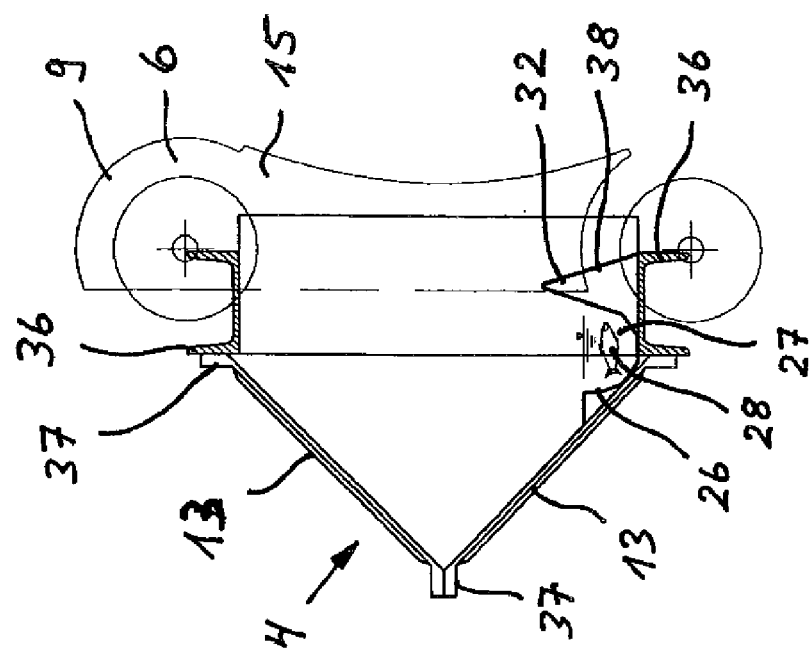
Fig. 7
Fig. 6

TRAVELING BAND SCREEN MACHINE

The invention relates to a traveling band screen machine for mechanically depositing and extracting solid components, solid bodies or solid matter from a stream of liquid flowing in a sluice channel, in particular a screen or filter rake for process water, cooling water or waste water streams or for use in sewage treatment plants or hydroelectric power stations or for use in a water supply channel of a power station cooling water intake system.

Such traveling band screen machines comprise a plurality of screen panels that form a revolving endless screen band immersing into the stream of liquid, in which a plurality of screen panels that are juxtaposed and arranged consecutively in the direction of movement of the endless screen band, both in the downwardly moving section of the endless screen band and in the upwardly moving section of the endless screen band, respectively form a common screen surface in the sluice channel, wherein the direction of flow both for the downwardly moving section of the endless screen band and for the upwardly moving section of the endless screen band is directed from the inside of the endless screen band through the screen panels to the outside of the endless screen band, a drive means for driving the endless screen band in its direction of movement and a cleaning means arranged in the upper guidance (return, reversal, turn back, redirection) zone of the endless screen band in order to clean screen panels lifted out of the stream of liquid in a cleaning zone of the traveling band machine, for example by means of spray nozzles or compressed air nozzles arranged on the outside of the endless screen band, as well as a debris collecting drain arranged on the inside of the endless screen band opposite to the spray nozzles to collect debris that is sprayed off the endless screen band.

Traveling band screen machines of this type are usually provided with a number of screen panels that as a rule are interlinked and form a revolving endless screen band immersing into the stream of liquid as well with a drive for the endless screen band, whereby deposition and extraction of solid matter from the stream of liquid is preferably performed continuously. The screen panels comprise screen inserts to separate solid matter from the stream of liquid; solid matter cannot pass through the traveling band machine if its dimensions are larger than the slit width or mesh aperture of the screen inserts and thus is deposited on the screen panels. A wide variety of screen inserts can be used, for example wire-weave screens, perforated screen plates, wedge-wire screens with individual rods, wherein the individual rods do not have to be round but have an optimized profile, screen gratings or any other screen materials that are suitable for filtering.

The revolving movement of the endless screen band means that solid matter deposited on the screen panels are conveyed upwards out of the stream of liquid and is cast off or taken off from the screen panels at a stripping station above the water surface. By spraying down the screen panels at the stripping station, the screen panels can be thoroughly cleaned before the screen panels are once more plunged into the stream of liquid.

A variety of different types of traveling band machines is known; they are distinguished by the direction of through-flow of the upwardly and downwardly moving sections of the endless screen band. There are "through-flow pattern" ("transverse flow"), "out-to-in flow pattern" ("dual flow") and "in-to-out flow pattern" ("center flow") types. In the "through-flow pattern" type, the screen panels are arranged transversely to the direction of flow of the sluice channel and the screen panels that move downwardly are arranged behind the upwardly moving screen panels in the direction of flow. In the "out-to-in flow pattern" and "in-to-out flow pattern" types of construction, the screen panels are arranged in the direction of flow of the sluice channel. In the "out-to-in flow pattern" type of construction, the contaminated water side is the outside of the upwardly and downwardly moving sections and the clean water side is the interior space between the two sections; the opposite is the case for the "in-to-out flow pattern" type of construction.

The invention is concerned with the "in-to-out flow pattern" type, i.e. a traveling band screen machine wherein the direction of flow for both the downwardly moving section of the endless screen band and for the upwardly moving section of the endless screen band is directed from the inside of the endless screen band through the screen panels to the outside of the endless screen band. This type is preferred as it results in a low pressure drop in the stream of liquid, avoids deposits on the bottom and means that debris can be separated from the endless screen band in a manner suited to the purpose.

Further significant technical and practical differences between a through-flow pattern traveling band machine such as that known from patent document U.S. Pat. No. 6,187,184 B1, for example, and a traveling band machine of the "in-to-out flow pattern" kind of construction are as follows. In through-flow pattern traveling band machines, debris is deposited on the outside of the screen band and as a result, after it has been extracted using the screen band, it is sprayed off the screen band by means of cleaning means operating on the inside of the screen band and spraying from the inside to the outside. Thus, the spray nozzles are between the upwardly moving and downwardly moving sections of the screen band, i.e. "inside", and spray the debris "outwards".

In a traveling band machine of the "in-to-out flow pattern" type, in contrast, debris is deposited on the inside of the screen band and thus is sprayed off by means of a cleaning means that operates from the outside and sprays from the outside inwards. A traveling band screen of the "in-to-out flow pattern" type thus comprises, in the upper guidance zone of the endless screen band, a cleaning means for cleaning screen panels lifted out of the stream of liquid in a cleaning zone of the traveling band screen machine by means of spray nozzles or compressed air nozzles arranged on the outside of the endless screen band as well as a debris collecting drain arranged opposite to the spray nozzles or compressed air nozzles on the inside of the endless screen band to collect debris sprayed off the endless screen band.

Thus, traveling band screen machines of the "through-flow pattern" type can be distinguished from the "in-to-out flow pattern" type both as regards the direction of through-flow and as regards the direction of cleaning.

The differences explained above between through-flow pattern and in-to-out flow pattern traveling band screen machines are significant from a technical and economic viewpoint. Through-flow pattern traveling band screen machines suffer from the following disadvantages over in-to-out flow pattern traveling band screen machines:

in through-flow pattern traveling band screen machines, only the screen panels that are upstream and moving upwards contribute to the screening process. The downwardly moving screen panels that are downstream do not contribute to the screening effect since they lie downstream of the upwardly moving screen panels. Moreover, the flow has to pass through the two successive sections with screen panels, causing a higher pressure drop in the stream of liquid. In traveling band screen machines of the type defined in the preamble, both the upwards and the downwardly moving screen panels are effective for screening;

in through-flow pattern screen band machines, only flat screens can be used; otherwise, for example, cleaning off with a spray means could no longer function. In traveling band screen machines of the type defined in the preamble, shaped screens, for example vaulted screens, which have a larger filter surface area, can be used;

in through-flow pattern traveling band screen machines, the maximum available filter surface is limited by the width of the sluice channel since the screen panels are arranged transversely to the direction of flow. In traveling band screen machines of the type defined in the preamble, there is no such limitation; the total filter surface area can be any size since the screen panels extend in the direction of flow and thus can be made as long as required;

in through-flow pattern traveling band screen machines, the channel bottom may become soiled and load of debris might be transferred to the clean water side; in traveling band screen machines of the type defined in the preamble, this is largely impossible.

Because of the technical differences and the concomitant advantages, known embodiments of through-flow pattern traveling band screen machines cannot be transferred directly to in-to-out flow pattern traveling band screen machines.

Examples of traveling band screen machines of the type discussed above are known from the following references: AT 199573, DE 533 243 A, DE 1 051 810 A, DE 1 083 231 A, DE 1 942 234 A, DE 39 32 922 C1, DE 44 43 091 C1 (in the drum screen construction), U.S. Pat. No. 4,812,231 and EP 0 913 182 A1.

Prior art traveling band screen suffer from the problem that not only solid components, solid bodies or solid matter are deposited in the screen panels and screened by means of the traveling band screen out of the sluice channel and removed, but also aquatic animals such as fishes, crabs, larvae etc. are caught in the screen insert of the screen panels or are caught in the solid matter that is deposited and screened together with that solid matter out of the sluice channel and transported into the debris collecting drain and discharged. This is a problem on ecological and animal protection grounds. Even if, as is currently economically impractical, the aquatic animals were to be sorted once more from the debris collecting drain by means of complex sorting means and are not discharged together with the debris that is screened out but returned to the sluice channel on the contaminated water and/or the clean water side, then a large proportion of the aquatic animals would be injured or killed by the effect of the spray nozzles and by impacting in the debris collecting drain with excised solid bodies such as branches etc.

For this reason, the prior art is at pains to prevent aquatic animals from getting into the traveling band screen machine and being thereby removed from the sluice channel by means of prescreening devices or electrical fish scaring units. These devices have only a limited effect, however, and so in practice, operating the traveling band screen machine leads to an unacceptable proportion of aquatic animals being removed from the sluice channel.

SUMMARY OF THE INVENTION

In the light of this prior art, the object of the invention is to provide a traveling band screen machine of the type defined above which allows as careful as possible a handling of aquatic animals extracted from the sluice channel by the traveling band screen and their return to the sluice channel.

In accordance with the invention, this problem is solved by means of a traveling band screen machine with the features of claim 1. Preferred embodiments and variations of the invention will become apparent from the dependent claims and the following description and accompanying drawings.

A traveling band screen machine in accordance with the invention having a plurality of screen panels that form a revolving endless screen band immersing into the stream of liquid in which a plurality of screen panels that are juxtaposed and arranged consecutively in the direction of movement of the endless screen band, both in the downwardly moving section of the endless screen band and in the upwardly moving section of the endless screen band, respectively form a common screen surface in the sluice channel, wherein the direction of flow is from the inside of the endless screen band through the screen panels to the outside of the endless screen band both for the downwardly moving section of the endless screen band and for the upwardly moving section of the endless screen band, a drive means for driving the endless screen band in its direction of movement and a cleaning means arranged in the upper guidance zone of the endless screen band for cleaning screen panels lifted out of the stream of liquid in a cleaning zone of the traveling band screen machine by means of spray nozzles or compressed air nozzles arranged on the outside of the endless screen band, and a debris collecting drain arranged on the inside of the endless screen band opposite to the spray nozzles or compressed air nozzles to collect debris sprayed off the endless screen band, thus has the particularity that it comprises screen panels that each have a fish lifting channel on their inflow side, which is arranged and constructed such that it is located at the lower end of the upwardly moving screen panels, in the upwardly moving screen panels it respectively forms a collecting recess filled with liquid for aquatic animals found in the respective screen panel, whereby upon movement of the endless screen band with the screen panel, the liquid contained in the collecting recess and aquatic animals therein are lifted out of the stream of liquid in the direction of movement of the endless screen band and in the upper guidance zone of the endless screen band it is emptied in an emptying zone of the traveling band screen machine into a catch collecting channel by tilting the screen panel and the collecting recess, wherein the cleaning zone is arranged so far behind the emptying zone in the direction of movement of the endless screen band that the collecting recesses are emptied before they reach the cleaning zone.

Tilting the screen panel and the collecting recess is thus carried out such that the screen panel and the collecting recess comprised in the screen panel follow a path curve defined by the upper guidance of the endless screen band, i.e. the chain guidance, and are thus inclined. In this manner, the collecting recesses preferably empty themselves without carrying out any additional tilting of the collecting recesses and/or the screen panels with respect to the endless screen band or the chain. In particular embodiments, such additional tilting devices are possible, but as a rule they are not necessary since even in a fixed position relative to the endless screen band, the collecting recesses are tilted and emptied by the guidance of the endless screen band.

In the context of the invention, it has been shown that by using the fish lifting channels with collecting recesses of the invention, which may also be described as pockets, gulleys or basins, the aquatic animals in the collecting recesses filled with water can be lifted out and the aquatic animals can be returned to the sluice channel in a gentle manner, upstream or downstream of the traveling band screen machine, i.e. to the contaminated water side or to the clean water side of the endless screen band.

BRIEF DESCRIPTION OF THE DRAWINGS

The invention will now be described in more detail with the aid of the embodiments illustrated in the drawings. The particular features described therein can be employed individually or in combination in order to produce preferred embodiments of the invention. They show:

FIG. 6: a vertical section through a first screen panel with a fish lifting channel; and FIG. 7: a vertical section through a second screen panel with a fish lifting channel.

DETAILED DESCRIPTION

Figure 1:
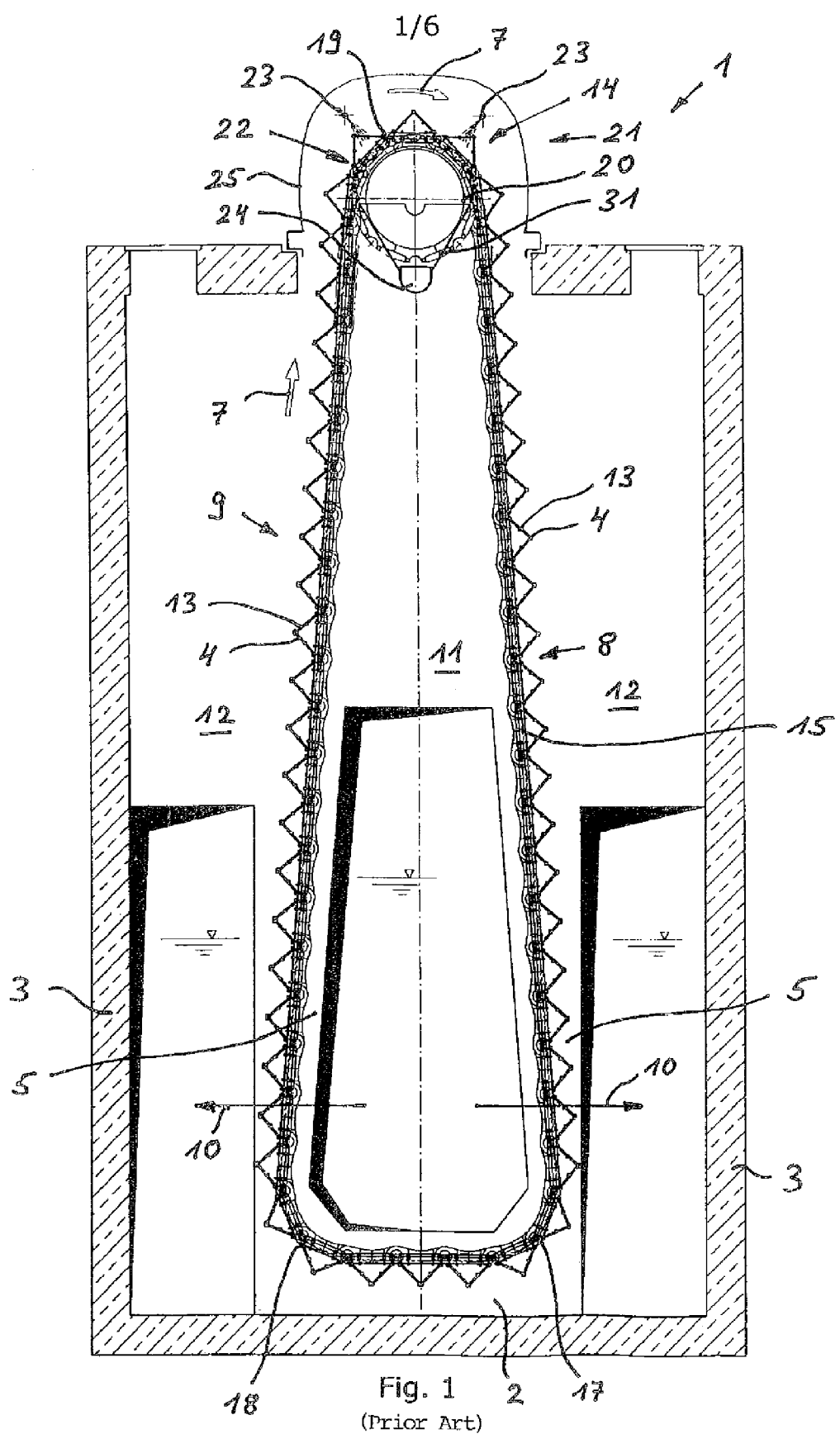
FIG. 1: a vertical section through a traveling band screen machine of the prior art.

FIG. 1 shows, in vertical section, a traveling band screen machine 1 for mechanical deposition and extraction of solid components, solid bodies or solid matter from a stream of liquid flowing in a sluice channel. Said traveling band screen 1 is, for example, a screen or filter rake for process water, cooling water or waste water streams or for sewage treatment plants or hydroelectric power stations or for use in a water supply channel 2 of a cooling water intake system 3 of a power station, a petrochemical or seawater desalination plant, a steel works or other industrial plant. Screening is the final cleaning stage in the water intake and is of particular importance since downstream systems such as pumps or condensers have to be reliably protected against disturbance from solid components in the water which are extracted by the traveling band screen machine 1.

Such traveling band screen machines 1 permit a high throughput typically of 100000 m$^3$/h with smallest sizes. Typical design specifications are: machine length (in direction of flow) 1.0-4.5 m, channel width (transverse to direction of flow) 2.5-7.0 m, chamber depth up to 20 m, height of construction above base 1.6-2.2 m and mesh aperture 0.2-10 mm.

The traveling band screen machine 1 comprises a plurality of screen panels 4 that form a revolving endless screen band 6 immersing into the stream of liquid 5, in which a plurality of screen panels 4 that are juxtaposed and arranged consecutively in the direction of movement 7 of the endless screen band 6 respectively form a common screen surface in the channel 2 or stream of liquid 5 both in the downwardly moving section 8 of the endless screen band 6 and in the upwardly moving section 9 of the endless screen band 6.

Both for the downwardly moving section 8 of the endless screen band 6 and for the upwardly moving section 9 of the endless screen band 6, the direction of flow 10 through the screen panels 4 is directed from the inside 11 of the endless screen band 6 through the screen panels 4 to the outside 12 of the endless screen band 6. This embodiment of the through-flow of the screen panels of a traveling band screen machine 1 is described as in-to-out flow pattern. Correspondingly, the inside 11 of the endless screen band 6 is the contaminated water side and the outside 12 of the endless screen band 6 is the clean water side of the screen panels 4, the endless screen band 6 and the traveling band screen machine 1.

From the contaminated water side, water to be purified is supplied to the screen panels 4; debris is deposited on the inside of the screen panels 4 which comprise a screen insert 13 for this purpose and the screened or filtered water leaves on the clean water side of the screen panels 4. The debris caught in the screen panels 4 is lifted out by the revolving movement of the endless screen band 6 in the direction of movement 7 with the upwardly moving section 9 from the stream of liquid 5 and conveyed to a cleaning zone 14 where it is separated from the endless screen band 6.

In order to allow the endless screen band 6 to revolve, the screen panels 4 are connected together with a traction or conveying means, generally two maintenance-free plate chains 15 which each run on one end of the screen panels 4. The chain 15 and the screen panels 4 are guided in a path curve in a guide 16 (see FIG. 2) anchored in the construction 3, wherein the seal required between the screen panels 4, chain 15, chain track and guide sections is provided on the clean water side in order to ensure that the water flows through the screen panels 4 and not around them. In order to obtain a high throughput, the screening device 1 has two lower guidance sections 17, 18 arranged at a distance from each other.

In order for driving the endless screen band 6 in its direction of movement 7, a drive means 19 is provided with a drive motor and at least one sprocket 20. The drive motor can drive one or both chains 15. Varying the speed of the endless screen band 6 means that the water throughput can be optimally matched to the screen band cleaning. To protect the chains 15 and chain tracks from corrosion, in particular from the challenges presented by seawater, special anodes can be inserted to contribute to cathodic corrosion protection. The endless screen band 6 is guided in the upper zone about an upper guidance 21 constituted by the sprocket 20.

The screen panels 4 may have a screen insert 13 which is flat. However, FIG. 1 shows preferred screen panels 4 with a screen insert 13 which is convex on the clean water side in order to create a larger screen surface. Such convex screen inserts 13 may, for example, be formed by a vaulted screen, bowed screen, involute screen, stepped screen or trapezoidal screen and provide a high water throughput for a small size of screen panel 4 and thus of the entire traveling band screen machine 1.

Figure 2:
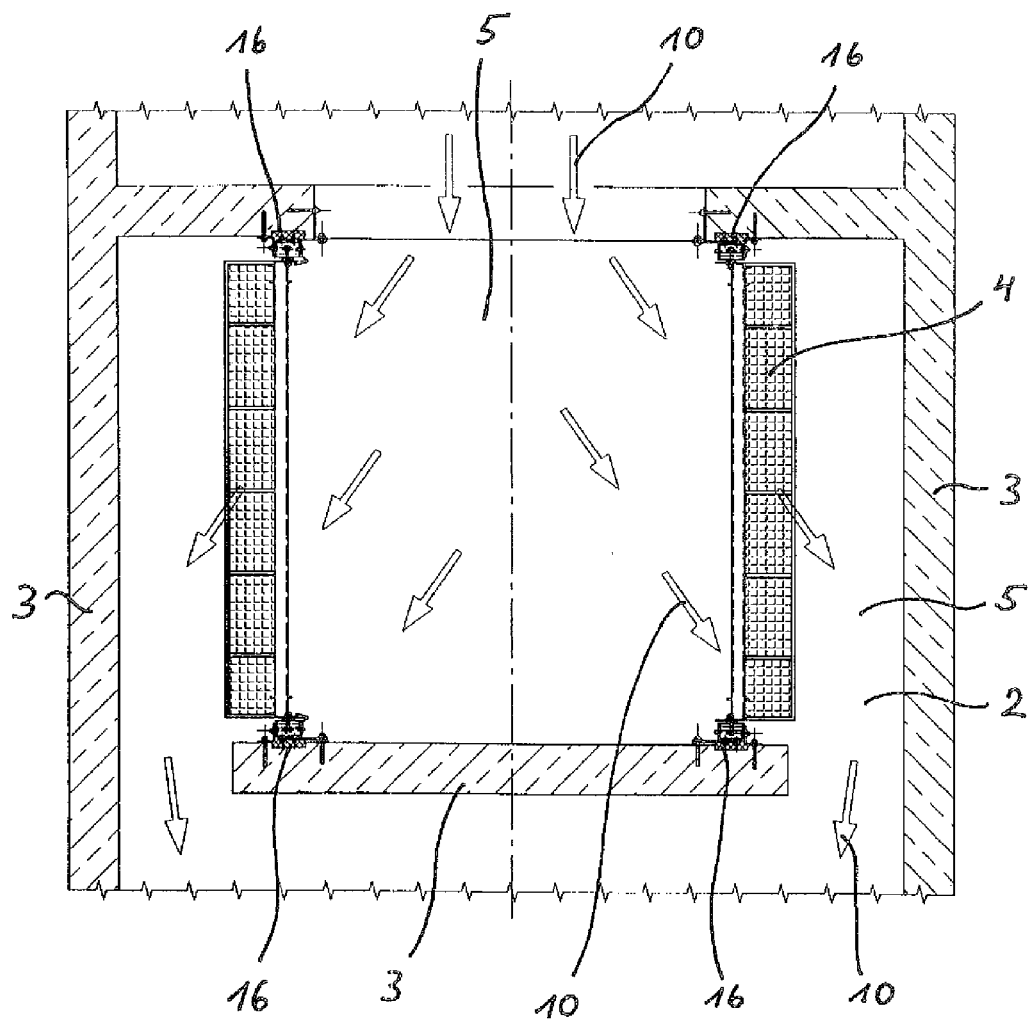
FIG. 2: a horizontal section through FIG. 1.

FIG. 2 shows a horizontal section of the traveling band screen machine 1 of FIG. 1. The direction of movement through the endless screen band 6 is from the inside outwards; it is installed longitudinally to the direction of water flow with the open or inflow side of the traveling band screen machine 1 towards the inflowing stream. The contaminated water flows through the screen panels 4 on both sides of the traveling band screen machine 1 and leaves it in two streams. The traveling band screen machine 1 divides the stream of liquid 5 through the construction 3 and approximately half of it is deflected to the left or to the right. In this manner, the endless screen band 6 is immersed in the stream of liquid such that the screen panels 4 are oriented longitudinally to the original direction of flow of the stream of liquid 5.

The screen panels 4 are thus oriented essentially parallel to the direction of flow or inflow direction of the stream of liquid 5 in the channel 2 and are essentially transversely permeated. One half of the divided stream of liquid 5 is then directed to the left through the left hand section 9 and the other half of the stream of liquid 5 is directed to the right through the right hand section 8 of the endless screen band 6. After flowing through the screen panels 4 of the endless screen band 6, the two halves of the stream of liquid 5 are deflected again and brought together.

Figure 3:
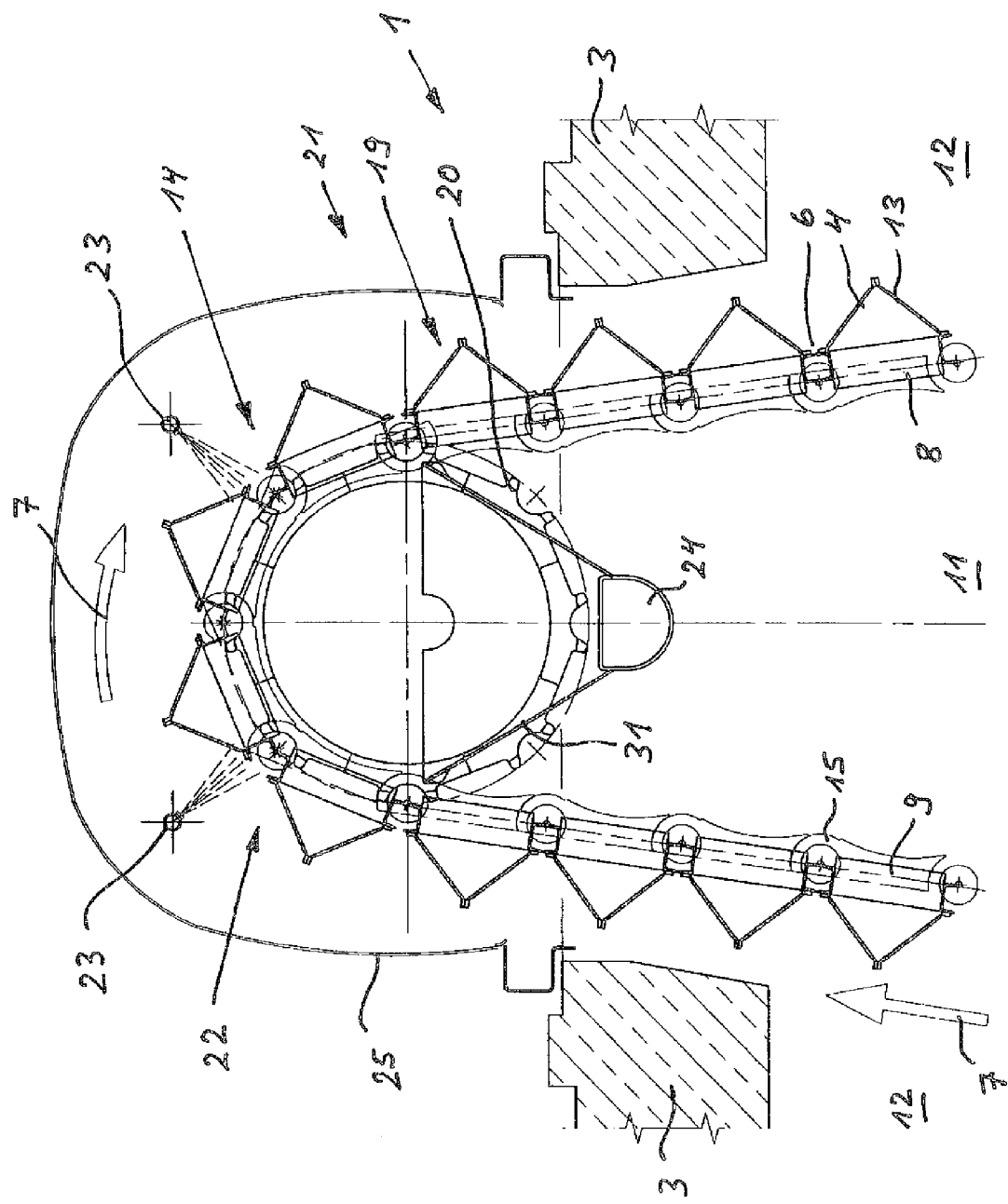
FIG. 3: a vertical section of the upper guidance zone of the traveling band screen machine of FIG. 1.

FIG. 3 shows a vertical section of the upper guidance zone of the endless screen band 6 of the traveling band screen machine 1 of FIG. 1 where, by means of a cleaning means or spray means arranged there to clean screen panels 4 lifted out of the stream of liquid 5 in a cleaning zone 14 and a further cleaning zone 22 of the traveling band screen machine 1 by means of spray nozzles 23 arranged on the outside 12 of the endless screen band 6 as well as a debris collecting drain 24 arranged on the inside 11 of the endless screen band 6 opposite the spray nozzles 23, adhering debris is cleaned off the screen panels 4.

The debris load is transported adhering to the insides of the upwardly moving screen panels 4 from the operational level to the cleaning zone 14, 22. Coarser bits fall directly under the effect of gravity alone into the debris collecting drain 24, which is also known as the contaminated water collecting channel. Spraying with the spray nozzles 23 carries out intensive cleaning of the screen panels 4 or their screen surfaces and the screen insert 13.

Aquatic animals that are caught in the screen panel 4 or the screen insert 13 are is sprayed off in the cleaning zone 14, 22 together with other debris and fall together with coarse components of the debris into the debris collecting drain 24. They are injured or killed thereby and they are removed as waste together with the debris screened out of the stream of liquid 5 by the traveling band screen machine 1.

When on cleaning the screen panels 4, stubborn debris remains stuck on the screen panel 4, then it remains on the inside 11 of the endless screen band 6 where, because of the revolving movement of the endless screen band, it will again be sprayed in the cleaning zone 14, 22 and finally will be effectively removed. Coarser sediments, rolling matter and floating bits will also necessarily arrive in the inside zone 11 of the traveling band screen machine 1 and will be removed therefrom. Debris on the bottom of the channel 2 and carry-over of debris onto the clean water side, often observed with other flow models, are thus impossible.

The spray means with the spray nozzles 23 or the entire upper head of the traveling band screen machine 1 are covered by a cover 25. Spraying of the screen panels 4 can be controlled externally. A manual or automatic spray nozzle cleaning means may be provided.

Figure 4:
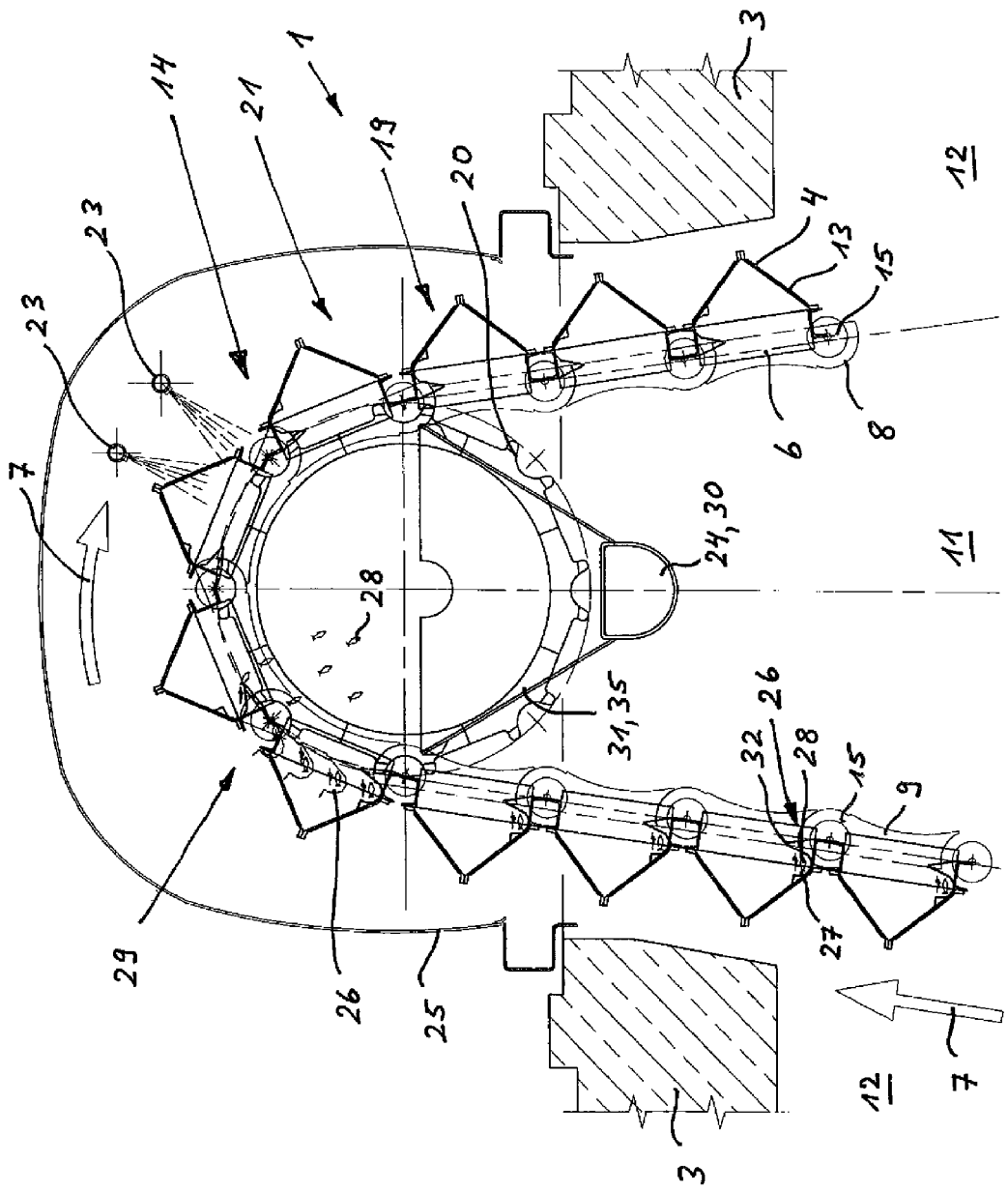
FIG. 4: a vertical section through the upper guidance zone of a first embodiment of a traveling band screen machine in accordance with the invention.
Figure 5:
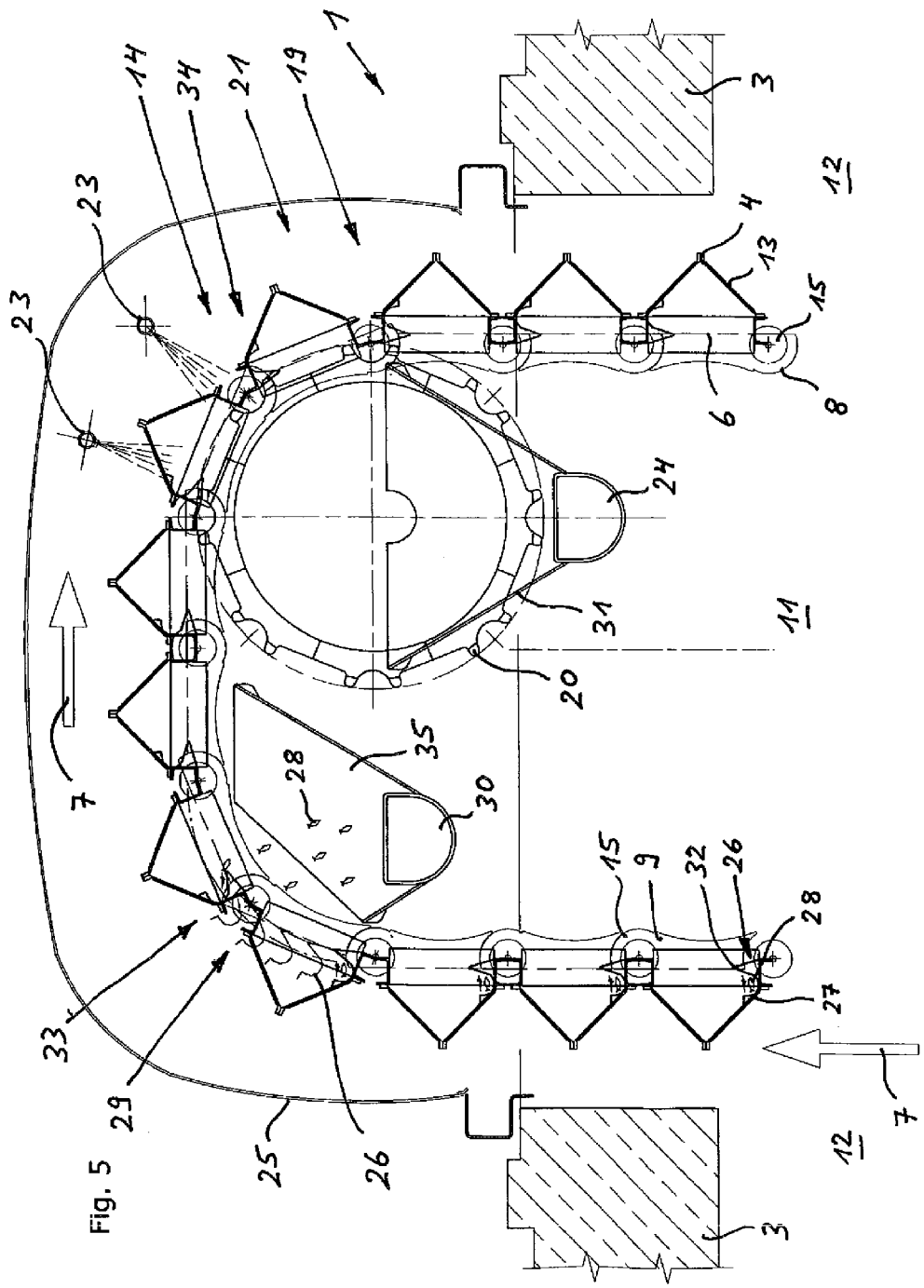
FIG. 5: a vertical section through the upper guidance zone of a second embodiment of a traveling band screen machine in accordance with the invention.

FIGS. 4 and 5 illustrate the features of a traveling band screen machine 1 of the invention that differ from a prior art traveling band screen machine 1. This means that the features explained in relation to FIGS. 1 to 3 could also be relevant to the traveling band screen machine 1 of the invention insofar as they have not been transformed in order to conform with the invention.

FIG. 4 shows a vertical section through the upper guidance zone of a first embodiment of a traveling band screen machine 1 of the invention with screen panels 4 that have a fish lifting channel 26 on the inflow side, i.e. the contaminated water side. The fish lifting channels 26 are arranged and constructed here such that in the upwardly moving screen panels 4, i.e. in the upwardly moving section 8 of the endless screen band 6, they are arranged at the lower end of the screen panel 4, in the upwardly moving screen panels 4 they form a collecting recess 27 filled is with liquid for aquatic animals 28 found in the respective screen panel 4 whereby, on movement of the endless screen band 6 with the screen panel 4, the liquid contained in the collecting recess and aquatic animals 28 caught therein are lifted out of the stream of liquid 5 in the direction of movement 7 of the endless screen band 6 and in the upper guidance zone of the endless screen band 6, in an emptying zone 29 of the traveling band screen machine 1, are emptied into a catch collecting drain 30 by tilting the screen panel 4 and the collecting recess 27.

To this end, the cleaning zone 14 is arranged in the direction of movement 7 of the endless screen band 6 far enough behind the emptying zone 29 such that the collecting recesses 27 are emptied before they reach the cleaning zone 14. The aquatic animals 28 thus do not drop from the screen panels 4 together with the coarse debris nor are they sprayed off together with the adhering debris, but have already been removed from the collecting recesses 27. Until this point in time, the aquatic animals 28 remain in the water in the collecting recesses 27. This creates the opportunity to separate the aquatic animals 28 from the other debris in a careful manner and to feed them back into the sluice channel. In the embodiment shown in FIG. 4, in which the catch collecting drain 30 is the debris collecting drain 24, a separator, not shown, for example a separating partition would be necessary, in order to prevent the aquatic animals 28 from falling into the collecting funnel 31 of the debris collecting drain 24, but instead into a catch collecting drain 30 which is separate from the debris collecting drain 24.

Thus, a traveling band screen machine 1 with gentle fish return has been proposed. To this end, the screen panels 4 each have a fish lifting channel 26 in which fishes 28 in a collecting recess 27 filled with liquid are lifted out of the stream of liquid in a gentle manner and then, in the upper guidance zone 21 of the endless screen band 6, in an emptying zone 29 of the traveling band screen machine 1, are emptied out into a catch collecting drain 30 by tilting the screen panel 4 and the collecting recess 27 before the screen panel 4 reaches the cleaning zone 14 with the spray nozzles 23 in which debris picked up by the screen panel 4 from the sluice channel is cleaned off into the debris collecting drain 24. This embodiment thus allows careful removal of the aquatic animals 28.

In a traveling band screen machine 1 of the invention, the aquatic animals 28 are both more carefully and more effectively extracted from the sluice channel and fed back thereto than in a different, through-flow pattern type of traveling band screen machine known from U.S. Pat. No. 6,187,184 B1. This is because of the particular inventive embodiment, involving emptying the liquid in the full collecting recesses 27 with the aquatic animals 28 trapped therein. In U.S. Pat. No. 6,187,184 B1, the aquatic animals are emptied onto a screen in an emptying zone that separates the aquatic animals from the water. The water falls through the screen back into the sluice channel, whereupon the aquatic animals skid along the screen and only then go into a collecting drain.

In contrast, in accordance with the invention, the collecting recesses 27 filled with liquid are emptied together with the aquatic animals found therein into a catch collecting drain 30.

In the traveling band screen machine of U.S. Pat. No. 6,187,184 B1, the aquatic animals are thus emptied onto a screen, but in the invention they are emptied into a catch collecting drain. Furthermore, in the traveling band screen machine of U.S. Pat. No. 6,187,184 B1, the water of a collecting recess is emptied into the sluice channel, but in the invention it is emptied into the catch collecting drain. In the traveling band screen machine of U.S. Pat. No. 6,187,184 B1, the aquatic animals are separated from the surrounding water of a collecting recess, but in the invention the aquatic animals are emptied together with the surrounding water of a collecting recess and are collected therewith in the catch collecting drain.

Spraying of the aquatic animals constitutes a further difference. In U.S. Pat. No. 6,187,184 B1, the aquatic animals separated by means of the screen from the water of the fish lifting channel are inevitably sprayed with low pressure spray means, namely on the one hand in order to provide them with at least a moist environment so that they do not dry out, and on the other hand in order to convey them along the inclined screen into the catch collecting drain. Clearly, this does not constitute careful treatment of the aquatic animals for the following reasons: (i) the aquatic animals fall from a certain height onto a hard surface, namely the screen; (ii) the speed at which the aquatic animals impinge onto the screen is increased by the spray means; (iii) the aquatic animals are exposed to a stream of spray of a spray means operating from the outside; (iv) the aquatic animals are exposed to a stream of spray of a spray means operating from the inside; (v) the aquatic animals must skid over the inclined screen; (vi) the aquatic animals are not permanently in water but merely in a moist environment brought about by the spray means while skidding over the screen and the adjacent ramp.

The invention avoids all of these disadvantages because the aquatic animals 28 and the water of the fish lifting channel, i.e. the collecting recesses 27, are emptied into a catch collecting drain 30 together.

Furthermore, additional low pressure spray means to moisten and transport aquatic animals as in the traveling band screen machine of U.S. Pat. No. 6,187,184 B1 require more investment than in the invention since the collecting recesses 27 can preferably be constructed so that they are emptied by gravity alone without the need for the screen panels 4 to be cleaned by the cleaning means. Furthermore, the low pressure spray means required in U.S. Pat. No. 6,187,184 B1 mean that already in the emptying zone, debris is separated from the screen panels and falls onto the fish screen. The following disadvantages arise: the aquatic animals lying on the screen could be injured by falling debris, the screen could be clogged by the debris and debris could get into the collecting drain. These disadvantages do not arise with the invention.

A traveling band screen machine 1 in accordance with the invention thus has the following features in preferred embodiments. In the emptying zone 29, the water is advantageously emptied out of the collecting recesses 27 together with the aquatic animals 28 therein into a catch collecting drain 30, preferably directly into the catch is collecting drain 30. On emptying the collecting recesses 27 with the aquatic animals 28 into the catch collecting drain 30, it is not necessary to spray the aquatic animals 28 with water by means of a spray means in order to provide a damp environment for them so that they do not dry out or in order to transport them along a conveyor path to the catch collecting drain 30, since the aquatic animals 28 can remain in the water of the collecting recesses 27 and together with the water emptied out of the collecting recesses 27, i.e. the water from the respective collecting recesses, can be emptied into the catch collecting drain 30, preferably directly into the catch collecting drain 30. The aquatic animals 28 are thus permanently in water, starting from the sluice channel via the collecting recesses 27 and the catch collecting drain 30 and back to the sluice channel, apart from a brief, non-damaging moment during which they, together with the surrounding water, fall out of a collecting recess 27 into the catch collecting drain 30. Thus, a spray means for moistening or washing off the aquatic animals is not required.

A traveling band screen machine in accordance with the invention also has the following features in preferred embodiments. Preferably, in the emptying zone 29, both the aquatic animals 28 from the fish lifting channel 26 or from the collecting recess 27 and also the water from the fish lifting channel 26 or from the collecting recess 27 are emptied into the catch collecting drain 30, preferably directly into the catch collecting drain 30. The aquatic animals 28 from the fish lifting channel 26 or from a collecting recess 27 are thus advantageously not separated from the surrounding water from the fish lifting channel 26 or from the respective collecting recess 27, but the aquatic animals 28 are preferably emptied together with the water of the fish lifting channel 26 or the respective collecting recess 27 out of the respective collecting recess 27 and the aquatic animals 28 are collected together with the water of the respective collecting recess 27 from the catch collecting drain 30.

Furthermore, emptying the aquatic animals 28 together with the water surrounding them from a collecting recess 27 into the catch collecting drain 30 as opposed to emptying the aquatic animals 28 with the water surrounding them from a collecting recess 27 onto a hard surface, for example a screen, is also advantageous in that the risk of injuring the aquatic animals 28 when they fall on emptying is lower, in particular when, in accordance with a preferred further embodiment, the catch collecting drain 30 is permanently at least partially filled with liquid.

Additional measures, for example separation as mentioned above or in a preferred embodiment as will be explained in connection with FIG. 5, will enable the debris removed in the debris collecting drain 24 to be discharged without a significant number of aquatic animals 28 being in it, whereby the fishes can be handled in a careful manner, separated into the catch collecting drain 30 and returned without a significant quantity of debris being found in the catch collecting drain 30.

Accordingly, the traveling band screen machine 1 or the collecting recesses 27 are preferably constructed so that they are emptied under gravity alone, without the screen panels 4 being cleaned by the spray means. Emptying the aquatic animals 28 from the collecting recesses 27 or separating them out from the debris contained in the screen panels 4 is thus as a rule supported by the movement of the living aquatic animals themselves. In contrast to the aquatic animals 28, the majority of the debris remains in the emptying zone 29 adhering to the screen panel 4 and will only be separated in the cleaning zone 14. Naturally, in particular embodiments, a means for supporting gentle mechanical emptying or removal of the aquatic animals 28 from the fish lifting channels 26 and/or a coarse screen can be provided in order to prevent coarse debris in the emptying zone 29 from falling out of a screen panel 4 into the catch collecting drain 30.

The more screen panels 4 there are on the endless screen band 6 of the traveling band screen machine 1 that have a fish lifting channel 26, the higher will be the proportion of returned fish. Preferably, all of the screen panels 4 have a fish lifting channel 26. The same is true for the length of the fish lifting channels 26; preferably, they extend over the whole or almost the whole of the width of the screen panels 4.

In accordance with an additional advantageous feature, the fish lifting channels 26 each have a dam wall 32 on the inflow side that is sufficiently high to project above the level of the liquid in the collecting recess 27 in the upwardly moving section 9 of the endless screen band 6 when the collecting recess 27 is lifted out of the stream of liquid 5, and in the upwardly moving section 9 of the endless screen band 6, on the downstream side of the dam wall 32, forms a low-flow, no-flow, low-eddy or eddy-free zone in the fish lifting channel 26 when the collecting recess 27 is immersed in the stream of liquid 5.

FIG. 5 shows, in a variation of FIG. 4, a vertical section through the upper guidance zone of a second embodiment of a traveling band screen machine 1 according to the invention, wherein the catch collecting drain 30 is separate from the debris collecting drain 24. Here, in the direction of movement 7 of the endless screen band 6, the catch collecting drain 30 is arranged in front of the debris collecting drain 24, so that the collecting recesses 27 of the fish lifting channels 26 with the aquatic animals 28 contained therein are emptied into the catch collecting drain 30 before the respective screen panel 4 reaches the cleaning zone 14. Thus, the aquatic animals 28 are kept well away from the debris in a solicitous manner.

FIG. 5 also shows that the catch collecting drain 30 is arranged higher than the debris collecting drain 24. This has the additional advantage that the height through which the aquatic animals 28 fall on emptying the collecting recesses 27 is reduced, which improves upon the gentle handling up to completion of the return to the sluice channel. While in the embodiments of FIG. 4, the minimum height through which the aquatic animals 28 fall on emptying the collecting recesses 27 cannot be reduced because of the limiting conditions imposed by the chains 15 and their guidance, in the embodiment of FIG. 5, the drop height can be reduced. Furthermore, this embodiment has the advantage of a lower debris carry-over with the aquatic animals 28.

The short drop height of the aquatic animals 28 in the emptying zone 29 can be achieved and/or have the result that the distance from the catch collecting drain 30 to the emptying zone 29 of the endless screen band 6 is smaller than the distance from the debris collecting drain 24 to the cleaning zone 14 of the endless screen band 6. Advantageously, then, the distance from the catch collecting drain 30 to the emptying zone 29 of the endless screen band 6 may be fixed at less than 80%, preferably less than 60% of the distance from the debris collecting drain 24 to the cleaning zone 14 of the endless screen band 6.

In a further embodiment, FIG. 5 shows that the upper guidance 21 of the endless screen band 6 has two guidance bends arranged at a distance from each other, namely a first upper guidance bend 33 in the emptying zone 29 and a second guidance bend 34 formed by the sprocket 20 in the cleaning zone 14. In between, as can be seen in FIG. 5, a straight section of the track 16 or a section with a larger radius of curvature can be provided. The radius of curvature of the path curve of the endless screen band 6 in the emptying zone 29 and in the cleaning zone 14 may be smaller than that in the zone therebetween. As an example, the radius of curvature of the path curve of the endless screen band 6 in the emptying zone 29 and in the cleaning zone 14 is less than 80%, preferably less than 60% of the radius of curvature of the zone lying therebetween.

In accordance with another advantageous feature, the path curve of the endless screen band 6 in the emptying zone 29 is at approximately the same height as that in the cleaning zone 14. This results in a compact arrangement of the traveling band screen machine 1.

In both the embodiment of FIG. 4 and in that of FIG. 5, it may be advantageous for the catch collecting drain 30 to have a collecting funnel 35, in order to catch the aquatic animals 28 properly. It is also advantageous for the catch collecting drain 30 to be constructed such that it is permanently at least partially filled with liquid and thus on the one hand can cushion the fall of the aquatic animals 28 so that they do not impinge hard upon the catch collecting drain 30 and on the other hand to ensure that they are out of the water for as short a time as possible. The permanent water level in the catch collecting drain 30 can be obtained by a corresponding supply, the shape of the runoff or by pumping. In a further advantageous feature, the drive means for driving the endless screen band 6 is installed in the cleaning zone 14 or in the region of the debris collecting drain 24 because more space is available there to accommodate the chain guidance than in the emptying zone 29.

FIG. 6 shows a detailed view of FIGS. 4 and 5 with a screen panel 4 used in the upwardly moving section 9 of the endless screen band 6 with fish lifting channel 26, collecting recess 27, dam wall 32 and an aquatic animal 28 caught in the water of the collecting recess 27 and being conveyed upwards. The screen panel 4 comprises a screen panel frame 36 fastened to the chain 15. The screen panel frame 36 carries a screen insert frame 37, on which one or more screen inserts 13 are fixed. The screen inserts 13 form a vaulted screen. The fish lifting channel 26, the collecting recess 27 and the dam wall 32 in FIG. 6 are formed by a profiled insert 38 mounted as an additional component in the screen panel frame 36 or respectively the screen panel 4.

FIG. 7 shows a variation of FIG. 6 wherein a screen panel 4 formed from the upwardly moving section 9 of the endless screen band 6 with fish lifting channel 26, collecting recess 27, dam wall 32 and an aquatic animal 28 caught in the water of the collecting recess 27 and being conveyed upwards. The screen panel 4 comprises a screen panel frame 36, which is fastened to the chain 15. The screen panel frame 36 carries a screen insert frame 37 on which one or more screen inserts 13 are fixed. The screen inserts 13 form a stepped screen. In contrast to FIG. 6, the fish lifting channel 26, the collecting recess 27 and the dam wall 32 are not formed by a profiled insert 38 mounted as an additional component in the to screen panel frame 36 or respectively the screen panel 4, but are formed by a corresponding profile 39 of the screen panel frame 36 and thus are integrated into the screen panel frame 36. The profiled insert component 38 of FIG. 6 is thus not required, thereby saving on assembly costs. Furthermore, a larger effective screen surface can be obtained depending on the shape of the screen inserts 13.

LIST OF REFERENCE NUMERALS

1 traveling band screen machine
2 channel
3 construction
4 screen panel
5 stream of liquid
6 endless screen band
7 direction of movement of 6
8 downwardly moving section of 6
9 upwardly moving section of 6
10 direction of flow
11 inside
12 outside
13 screen insert
14 cleaning zone
15 chain
16 guide
17 first lower guidance bend
18 second lower guidance bend
19 drive means
20 sprocket
21 upper guidance
22 further cleaning zone
23 spray nozzle
24 debris collecting drain
25 cover
26 fish lifting channel
27 collecting recess
28 aquatic animal 29 emptying zone
30 catch collecting drain
31 collecting funnel for 24
32 dam wall
33 first upper guidance bend
34 second upper guidance bend
35 collecting funnel for 30
36 screen panel frame
37 screen insert frame
38 profiled insert
39 profile

The invention claimed is:

1. A traveling band screen machine for mechanically depositing and extracting solid components, solid bodies or solid matter from a stream of liquid flowing in a sluice channel the machine comprising:
   a plurality of screen panels that form a revolving endless screen band immersing into the stream of liquid in which a plurality of screen panels that are juxtaposed and arranged consecutively in the direction of movement of the endless screen band, both in the downwardly moving section of the endless screen band and in the upwardly moving section of the endless screen band, respectively form a common screen surface in the sluice channel,
   wherein the direction of flow is from the inside of the endless screen band through the screen panels to the outside of the endless screen band both for the downwardly moving section of the endless screen band and for the upwardly moving section of the endless screen band,
   a drive means for driving the endless screen band in its direction of movement,
   and a cleaning means arranged in the upper guidance zone of the endless screen band for cleaning screen panels lifted out of the stream of liquid in a cleaning zone of the traveling band screen machine by means of spray nozzles or compressed air nozzles arranged on the outside of the endless screen band, and a debris collecting drain arranged on the inside of the endless screen band opposite to the spray nozzles or compressed air nozzles to collect debris sprayed off the endless screen band,
   wherein the traveling band screen machine comprises screen panels that each have a fish lifting channel on their inflow side, which is arranged and constructed such that
      it is located at the lower end of the upwardly moving screen panels;
      in the upwardly moving screen panels it respectively forms a collecting recess filled with liquid for aquatic animals found in the respective screen panel, whereby upon movement of the endless screen band with the screen panel, the liquid contained in the collecting recess and aquatic animals therein are lifted out of the stream of liquid in the direction of movement of the endless screen band; and
      in an upper guidance zone of the endless screen band it is emptied in an emptying zone of the traveling band screen machine into a catch collecting channel by tilting the screen panel and the collecting recess,
   wherein the cleaning zone is arranged so far behind the emptying zone in the direction of movement of the endless screen band that the collecting recesses are emptied before they reach the cleaning zone,
   wherein
   the catch collecting drain is constructed separately from the debris collecting drain, and
   the upper guidance of the endless screen band comprises two guidance bends arranged at a distance from each other, namely a first upper guidance bend in the emptying zone and a second upper guidance bend in the cleaning zone.

2. The traveling band screen machine according to claim 1, wherein the catch collecting drain is arranged in front of the debris collecting drain in the direction of movement of the endless screen band, so that the collecting recesses of the fish lifting channels with the aquatic animals contained therein are emptied into the catch collecting drain before the respective screen panel reaches the cleaning zone.

3. The traveling band screen machine according to claim 1, wherein the catch collecting drain is arranged higher than the debris collecting drain.

4. The traveling band screen machine according to claim 1, wherein the distance from the catch collecting drain to the emptying zone of the endless screen band is smaller than the distance from the debris collecting drain to the cleaning zone of the endless screen band.

5. The traveling band screen machine according to claim 4, wherein the distance from the catch collecting drain to the emptying zone of the endless screen band is less than 80%, preferably less than 60% of the distance from the debris collecting drain to the cleaning zone of the endless screen band.

6. The traveling band screen machine according to claim 1, wherein the drive means comprises a sprocket arranged in a region of the upper guidance zone and the catch collecting drain is constructed separately from the debris collecting drain such that the catch collecting drain runs lateral past the side of the sprocket.

7. The traveling band screen machine according to claim 1, wherein the path curve of the endless screen band in the emptying zone is at approximately the same height as that in the cleaning zone.

8. The traveling band screen machine according to claim 1, wherein the radius of curvature of the path curve of the endless screen hand in the emptying zone and in the cleaning zone is smaller than in the zone therebetween.

9. The traveling band screen machine according to claim 8, wherein the radius of curvature of the path curve of the endless screen band in the emptying zone and in the cleaning zone is less than 80%, preferably less than 60% of the radius of curvature of the zone therebetween.

10. The traveling band screen machine according to claim 1, wherein the collecting recesses are constructed such that they are emptied into a catch collecting channel alone by tilting the screen panel and the collecting recess and by gravity acting thereby onto the water comprised in the collecting recesses without the screen panels being cleaned thereby by means of the cleaning means.

11. The traveling band screen machine according to claim 1, wherein the collecting recesses are constructed such that in the emptying zone, the water from the collecting recesses together with the aquatic animals therein is emptied into a catch collecting drain, preferably directly into the catch collecting drain.

12. The traveling band screen machine according to claim 1, wherein the collecting recesses are constructed such that in the emptying zone, on emptying the collecting recesses, the aquatic animals remain in the water of the collecting recesses and are emptied together with the water emptied out of the collecting recesses into the catch collecting drain, preferably directly into the catch collecting drain.

13. The traveling band screen machine according to claim 1, wherein the collecting recesses are constructed such that in the emptying zone, both the aquatic animals from a collecting recess and the water from a collecting recess are emptied into the catch collecting drain, preferably directly into the catch collecting drain.

14. The traveling band screen machine according to claim 1, wherein the collecting recesses are constructed such that in the emptying zone, the aquatic animals from a collecting recess are not separated from the surrounding water from a collecting recess.

15. The traveling band screen machine according to claim 1, wherein the collecting recesses are constructed such that in the emptying zone, the aquatic animals together with the water from the respective collecting recess are emptied out of the respective collecting recess and the aquatic animals together with the water of the respective collecting recess are collected by the catch collecting drain.

16. The traveling band screen machine according to claim 1, wherein the fish lifting channels each have a dam wall on the inflow side that is sufficiently high to project above the level of the liquid in the collecting recess in the upwardly moving section of the endless screen band when the collecting recess is lifted out of the stream of liquid, and in the upwardly moving section of the endless screen band, on the downstream side of the dam wall, forms a low-flow, no-flow, low-eddy or eddy-free zone in the fish lifting channel when the collecting recess is immersed in the stream of liquid.

17. The traveling band screen machine according to claim 1, wherein the catch collecting drain comprises a collecting funnel.

18. The traveling band screen machine according to claim 1, wherein the catch collecting drain is constructed such that it is permanently at least partially filled with liquid.

19. The traveling band screen machine according to claim 1, wherein the drive means for driving the endless screen band is installed in the cleaning zone or in the region of the debris collecting drain.

20. The traveling band screen machine according to claim 1, wherein it has screen panels with a screen insert that is convex on the clean water side.

21. The traveling band screen machine according to claim 20, wherein the screen insert is a vaulted screen, bowed screen, involute screen, stepped screen or trapezoidal screen.

* * * * *